United States Patent [19]

Swaim et al.

[11] 3,886,595

[45] May 27, 1975

[54] ACTUATOR FOR A DISC DRIVE APPARATUS

[75] Inventors: Ronald L. Swaim, Sunnyvale; John Cuda, San Jose; Timothy W. Martin, Los Altos, all of Calif.

[73] Assignee: Information Storage Systems, Inc., Cupertino, Calif.

[22] Filed: Feb. 13. 1974

[21] Appl. No.: 442,071

[52] U.S. Cl. .................... 360/106; 360/78; 360/98

[51] Int. Cl. ...................... G11b 5/48; G11b 25/04

[58] Field of Search ..................... 360/106, 97–98, 360/86, 72, 78, 75; 310/12–14, 27

[56] References Cited

UNITED STATES PATENTS

| | | | |
|---|---|---|---|
| 3,484,760 | 12/1969 | Perkins et al. | 360/98 |
| 3,768,083 | 10/1973 | Pejcha | 360/98 |
| 3,769,467 | 10/1973 | Gabor | 360/106 |

*Primary Examiner*—Alfred H. Eddleman
*Attorney, Agent, or Firm*—Gerald L. Moore

[57] ABSTRACT

This invention relates particularly to direct access data storage devices and, more particularly, to a disc drive wherein data is recorded on a rotating disc means of a read/write head movable to precise data track positions located on the disc surface. For accurate positioning of the heads relative to the disc, an actuator is provided which is mounted on the drive by elastic bodies located at points near a plane passing through the center of gravity of the actuator to limit the transmission of vibratory forces from the actuator to the drive.

5 Claims, 1 Drawing Figure

ACTUATOR FOR A DISC DRIVE APPARATUS

BACKGROUND OF THE INVENTION

Direct access storage devices of the type that employ a rotating disc or a plurality or stack of rotating discs as a storage media, commonly known as disc drives, are widely used in the computer industry. In such devices, one or more discs are mounted for rotating about a fixed axis in proximity to an access mechanism which carries an array of read/write heads. The access mechanism includes a linear motor generally mounted in alignment with an extension of a radius of the recording discs to facilitate movement of the read/write heads across the disc surfaces.

The position of the heads relative to the disc surface may be detected either by reading prerecorded tracks on one or more of the disc surfaces, or by auxiliary position detection means associated with the access mechanism. In either case, any unwanted movement of the heads relative to the discs will serve to disrupt the recording or reading of data. Therefore in the past such disc drives have utilized rather massive and extremely stiff base plates for mounting the disc pack support and the head access mechanism to limit all relative movement except that imparted by the actuator. The base plate, of necessity, not only supports the heads and discs in a manner to limit movement towards and away from each other but also to react against bending forces resulting from the fact that both the relatively heavy disc pack and actuator are mounted above and at opposite ends of the base plate. It is the primary purpose of this invention to provide an improved actuator and baseplate structure which limits the transmission of vibratory forces between these members and also limits the bending forces placed on the baseplate.

CROSS-REFERENCE TO RELATED APPLICATIONS

U.S. Pat. No. 3,768,083, *Baseplate Assembly for a Disc Drive*, Pejcha, issued Oct. 23, 1973.

U.S. patent application Ser. No. 432,009, filed Jan. 9, 1974 and entitled *Carriage Assembly for Magnetic Storage Drive*.

SUMMARY OF THE INVENTION

The present invention comprises a data storage apparatus for transferring data to or from a memory device, by the interaction between a read/write head and the memory device, and having a baseplate means for supporting the memory device on the baseplate, means for supporting the read/write head for movement across the memory device whereby various areas of the memory device and head are permitted to interact for transferring data therebetween, and an actuator for moving the head support means, with the actuator being mounted on the baseplate on elastic bodies located at points at or near a plane passing through the center of gravity of the actuator to limit the transmission of vibratory forces between the actuator and baseplate and also limit the bending forces exerted by the actuator on the baseplate.

DESCRIPTION OF THE INVENTION

Figure 1:
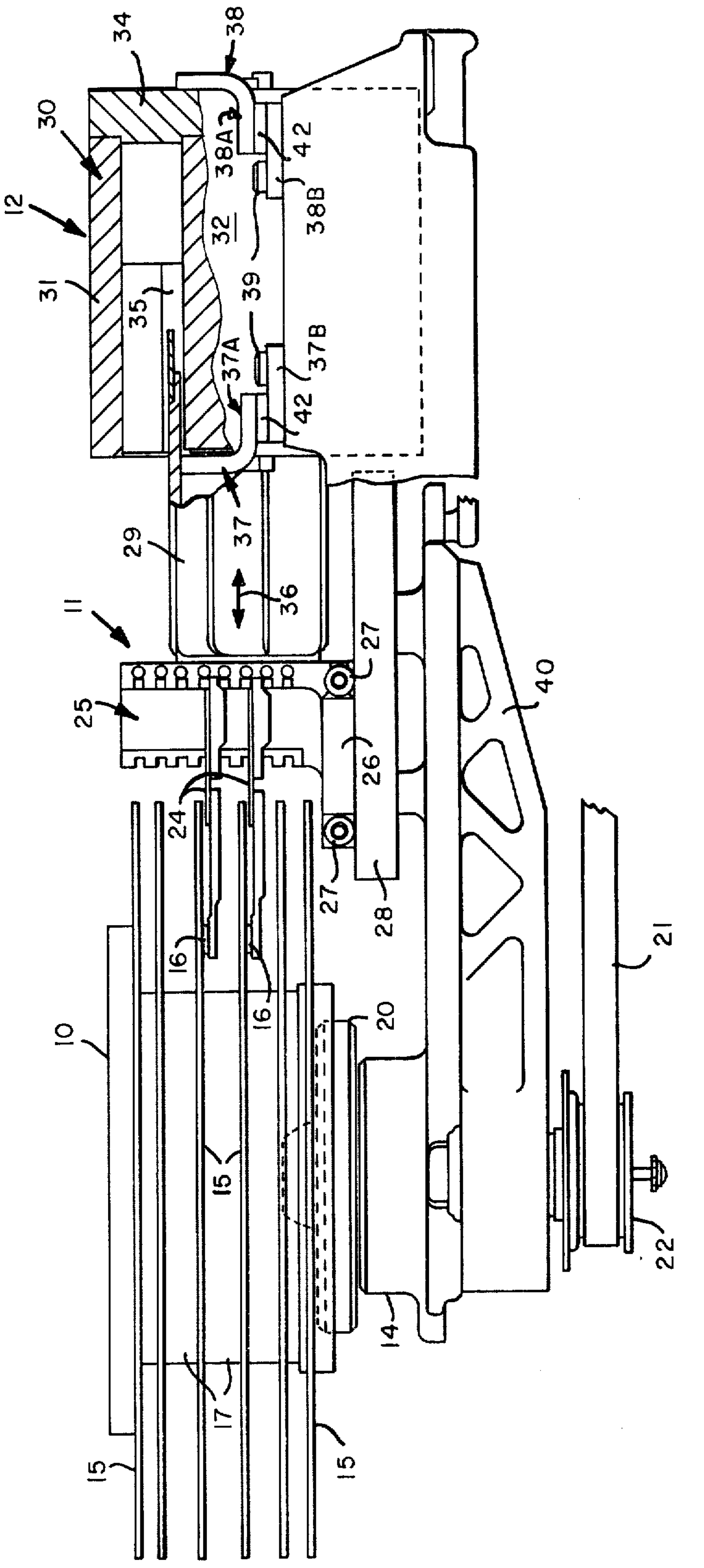
FIGURE 1 is a side plan view partially and cross-section showing a disc drive apparatus employing the invention.

In the drawing are shown the major components of a disc drive used to read and record data on a disc pack 10 and including a read/write head assembly 11 and a linear motor 12 mounted on a baseplate 40 for the purpose of reading and writing information in digital form on the surface of the individual discs 15. The data is recorded by an interaction between the read/write heads 16 and a magnetic coating (not shown) on the disc surface, such that discrete areas on the coating are magnetically aligned in accordance with the data.

Usually the memory device comprises a plurality of the discs 15 having the magnetic coating on both the upper and lower surfaces. The discs are mounted in spaced relationship by being held between cylindrically shaped spacers 17. The disc pack is precisely positioned by closely interfitting surfaces of the pack and a spindle shaft 20 which is journaled for rotary movement in the spindle housing 14. The spindle shaft is driven by a motor driven belt 21 extending around a spindle drive pulley 22 and powered by a motor (not shown).

Each read/write head 16 is supported on an arm 24 extending horizontally from a T-block-carriage assembly 25 for movement along an extension of the radius of the disc pack 10. Movement of the T-block-carriage 25 is facilitated by a plurality of supporting bearings 27 which bear against cooperating surfaces of a pair of parallel extending rails 28. In the embodiment shown, the carriage supports the T-block in a manner such that a plurality of head supporting arms 24 extend between the discs 15 in a manner to position one head adjacent each disc surface. For a more detailed description of the carriage, please refer to the before-mentioned application, Ser. No. 432,009.

Means to move the carriage assembly are provided in the form of the linear motor 12 comprising a coil or armature 29 which interfits and cooperates with a stator 30. The stator 30 comprises a permanent magnet having an outer cylindrical section 31 and an inner-core 32 joined by an end section 34 in a manner to present a cylindrical air gap 35 into which the coil can move. The coil 29 comprises a plurality of windings (not shown) through which is passed electrical current from any suitable source such that by adjusting the polarity and magnitude of the current flow, a reaction force can be caused between the permanent magnet field and the coil within the air gap 35 which tends to cause the armature to move back and forth in the direction of the arrow 36. In this manner, the carriage assembly is shifted along the rail 28 for positioning the heads 16 at discrete data locations on the disc surfaces 15.

As discussed before, energization of the actuator 12 causes movement of the carriage assembly 25 and also sets up an opposing force in the stator 30 which must be reacted by the baseplate 40. Acceleration or deceleration of the carriage assembly can result in the transmission of vibratory forces from the stator 30 through the baseplate and spindle to the disc pack 10 thereby resulting in unwanted movement between the disc pack and the read/write heads. Additionally, because the stator in the past has been fixed to the baseplate at points beneath the stator, the stator reaction force transmits a large amplitude bending moment to the baseplate in addition to the reaction force which moment acts to increase the unwanted movement between the disc pack and the read/write heads.

In accordance with the present invention, the stator 30 is mounted such that the supporting points on the baseplate are positioned at or near a plane extending parallel to the direction of movement of the carriage 25 and coil 29 and passing through or very near the center of gravity of the stator thereby allowing the baseplate to directly react any force on the stator caused by energization of the linear motor. For this purpose, a pair of supporting arms 37 and 38 at the right and left ends respectively of the stator 30 of the drawing are fixed to the baseplate by the bolting of the secondary mounting plates 37B and 38B to the baseplate by means of bolts 39 with the position of the joining of the baseplate section 40 and the mounting plates 37B and 38B being near the horizontal plane passing through the center of gravity of the stator 30. Actually, the forces on the actuator in the direction of movement of the armature act equally about the center of gravity of the stator such that by mounting the stator at the center of gravity, such forces are directly translated to the baseplate with little bending movement on the stator mounting means. In this manner, there is a minimum, if any, tilting or vertical movement of the stator which might otherwise affect the overall actuation or alignment of the linear motor.

In addition, there is provided an elastic support means or body 42 positioned between the extensions 37A and 38A of the mounting legs 37 and 38 and the secondary mounting plates 37B and 38B. The elastic body is firmly affixed to the bottom surfaces of the mounting leg extensions 37A and 38A and the top facing surface of the secondary mounting plates 37B and 38B, preferably by cementing parallel surfaces of the bodies to the adjacent mounting legs and mounting plates. These elastic bodies are made of a suitable viscoelastic damping material such as plasticized urethane which will deflect under sufficient force in the direction of the arrow 36 thereby permitting slight lateral movement of the stator 30 relative to the baseplate section 40. This movement which occurs during acceleration and deceleration of the coil 39 and the attached carriage assembly causes deformation of the elastic support body 42 which due to the damping characteristics of the support body, dissipates energy thus transferring less energy to the baseplate. Also the nature of the force transferred from the stator to the baseplate is changed from a short time duration impulsive force to a longer time duration force due to the deformation of the elastic support body. The elastic bodies are constructed so as to return to the normal shape for proper positioning of the stator during periods of constant velocity or periods when the armature is motionless. Further, the bodies are sufficiently stiff to support the weight of the motionless stator thereby preventing any contacting of the leg extensions and the baseplate.

By the positioning of the stator supports such that the elastic bodies are at or near the center of gravity of the stator, the elastic bodies generally are caused to deflect only in the linear direction of the arrow 36 thereby preventing any lateral movement of the stator which might otherwise result in contact of the stator with the coil 29. Also, even though a slight moment is placed on the baseplate caused by the thickness of these elastic bodies, this moment is minimized because of the mounting of the stator at or near the center of gravity.

That which is claimed is:

1. In a data storage apparatus for transferring data to or from a memory device by interaction between a read/write head and the memory device, a baseplate means for supporting the memory device on the baseplate, means for supporting the read/write head on the baseplate for movement across the memory device whereby various areas of the memory device and head are permitted to interact for transferring data therebetween, an actuator for moving the head support means relative to the memory device, and elastic support means having spaced surfaces fixed respectively to the baseplate and actuator to support the actuator on the baseplate in a manner permitting limited movement between the actuator and baseplate during movement of the head supporting means for positioning the head while limiting the transmission of vibratory forces between the actuator and baseplate.

2. A data storage apparatus as defined in claim 1 where the elastic support means is fixed to the actuator at a location near a plane passing through the center of gravity of the actuator.

3. A data storage apparatus as defined in claim 1 wherein the actuator comprises a linear motor having a stator and an armature, means for transmitting the motion of the armature to the head support means, and said elastic support means being fixed to the stator and the baseplate.

4. A data storage apparatus as defined in claim 3 wherein the elastic support means and the stator include adjacent horizontal surfaces fixed together and lying approximately in a plane passing through the center of gravity of the stator.

5. In a data storage apparatus for transferring data to or from a memory device by interaction between a read/write head and the memory device, a baseplate, means for supporting the memory device on the baseplate for movement past the read/write head, means for supporting the read/write head on the baseplate for movement across the memory device whereby various areas of the memory device and head are permitted to interact for transferring data therebetween, an actuator for moving the head support means relative to the memory device, said actuator comprising an interacting stator and armature means for transferring movement to the head support means, and means for mounting the stator on the baseplate, said stator mounting means being fixed to the stator and baseplate at points near a plane extending in the direction of movement of the head support means and passing through the center of gravity of the stator thereby to counteract any movement of the armature in a plane passing approximately through the center of gravity of the stator.

* * * * *